United States Patent [19]
Tanuma et al.

[11] Patent Number: 6,166,122
[45] Date of Patent: Dec. 26, 2000

[54] ALUMINA HYDRATE COATING FLUID, RECORDING SHEET AND RECORDED PRODUCT

[75] Inventors: Toshihiro Tanuma; Toshiya Matsubara, both of Yokohama, Japan

[73] Assignee: Asahi Glass Company Ltd., Tokyo, Japan

[21] Appl. No.: 09/189,401

[22] Filed: Nov. 10, 1998

[30] Foreign Application Priority Data

Nov. 17, 1997 [JP] Japan ..................... 9-315501

[51] Int. Cl.$^7$ ............................................. C08K 3/00
[52] U.S. Cl. ............................................. 524/430
[58] Field of Search .................................. 524/430

[56] References Cited

U.S. PATENT DOCUMENTS 4,785,049  11/1988  Balaba et al. .
5,104,730   4/1992  Misuda et al. .
5,691,046  11/1997  Matsubara et al. .

FOREIGN PATENT DOCUMENTS 0 634 286  1/1995  European Pat. Off. .

OTHER PUBLICATIONS

Derwent Abstract, AN 88–003131, JP 62 266568, Nov. 19, 1987.
Derwent Abstract, AN 87–324985, JP 62 231788, Oct. 12, 1987.
Derwent Abstract, AN 90–372941, JP 02 270588, Nov. 5, 1990.

*Primary Examiner*—Edward J. Cain
*Attorney, Agent, or Firm*—Oblon, Spivak, McClelland, Maier & Neustadt, P.C.

[57] ABSTRACT

An alumina hydrate coating fluid having alumina hydrate particles dispersed in an aqueous medium, which contains, as binders, a polyvinyl alcohol and a polymerizable binder which is a compound having a hydrocarbon group with a hydroxy group or a compound having a polyoxyalkylene chain, said compound having a substituent with an unsaturated bond or a substituent with an epoxy group.

8 Claims, No Drawings

ALUMINA HYDRATE COATING FLUID, RECORDING SHEET AND RECORDED PRODUCT

The present invention relates to an alumina hydrate coating fluid, a recording sheet and a recorded product.

In recent years, reflecting wide use of electronic still cameras and computers, the hard copy technology to record images on paper sheets has been rapidly developed. The ultimate goal is to bring the hard copy to the same level as silver halide photography, particularly to bring e.g. the color reproducibility, image density, gloss and weather resistance of the hard copy to the same level as the silver halide photography. As hard copy recording systems, various systems have been known including not only a system wherein a display indicating an image is directly photographed by silver halide photography, but also a sublimation type thermal transfer system, an ink jet system, and a system wherein an electrostatic transfer type is colored in various ways developed by various companies.

An ink jet system printer has been widely used in recent years, since full coloring is thereby easy, and the printing noise is thereby low. The ink jet system is a system wherein ink droplets are ejected at a high speed from nozzles to a recording material, and the ink contains a large amount of solvent. Therefore, the recording sheet for an ink jet printer is required to swiftly absorb the ink and have an excellent color-forming property. As such a recording sheet, one having an alumina hydrate porous layer formed on a substrate has been known (JP-A-2-276670, JP-A-2-276671).

In a case where such a recording sheet is used outdoors for a long period of time, particularly high weather resistance is required. It is an object of the present invention to provide a recording sheet having excellent ink absorptivity, high color reproducibility, and further having a high color density, high light resistance and high weather resistance.

The present invention provides an alumina hydrate coating fluid having alumina hydrate particles dispersed in an aqueous medium, which contains, as binders, a polyvinyl alcohol and a polymerizable binder which is a compound having a hydrocarbon group with a hydroxy group or a compound having a polyoxyalkylene chain, said compound having a substituent with an unsaturated bond or a substituent with an epoxy group.

With the alumina hydrate coating fluid of the present invention, which contains, as binders, a polymerizable binder in addition to polyvinyl alcohol a coating film having high weather resistance can be obtained. The polymerizable binder is required to be a compound having a substituent with an unsaturated bond or a substituent with an epoxy group.

The polymerizable binder is a compound having a hydrocarbon group with a hydroxy group or a compound having a polyoxyalkylene chain. Therefore, the polymerizable binder is highly hydrophilic, dissolves well in an aqueous solvent, and further, has high miscibility with polyvinyl alcohol.

In the alumina hydrate coating fluid of the present invention, the blend ratio of the polyvinyl alcohol and the polymerizable binder is preferably such that the polyvinyl alcohol is from 20 to 80 wt % to the total amount of the polyvinyl alcohol and the polymerizable binder. If the amount of the polyvinyl alcohol is less than 20 wt %, it tends to be difficult to coat the coating fluid uniformly on the substrate, and the coated surface is likely to peel off, such being undesirable. On the other hand, if the polyvinyl alcohol is more than 80 wt %, the effect of blending the polymerizable binder can not be obtained substantially, and the weather resistance of the coating film does not improve. Particularly preferred is a case where the polyvinyl alcohol is from 40 to 60 wt % to the total amount of the polyvinyl alcohol and the polymerizable binder.

The blend ratio of the binders to the alumina hydrate is preferably such that the total amount of the polyvinyl alcohol and the polymerizable binder is from 5 to 50 wt% to the alumina hydrate. If the amount of the binders blended is less than 5 wt %, the strength of the alumina hydrate layer tends to be insufficient. If the amount of the binder blended is more than 50 wt %, drawbacks during coating tend to increase, and the absorptivity of the coating film may decrease, and further the ink absorption may deteriorate.

The present invention further provides a recording sheet comprising a substrate and a porous layer having alumina hydrate particles bonded by a binder, formed on the substrate, wherein said binder comprises a polyvinyl alcohol and a polymerized body of a polymerizable binder which is a compound having a hydrocarbon group with a hydroxy group or a compound having a polyoxyalkylene chain, said compound having a substituent with an unsaturated bond or a substituent with an epoxy group. The recording sheet can be obtained by coating the coating fluid on the substrate, the polymerizing the polymerizable binder by e.g. heating. The recording sheet has high weather resistance, as compared with a recording sheet wherein only the polyvinyl alcohol is contained as a binder.

When recording is carried out by e.g. an ink jet printer on the recording sheet, a recorded product having a colorant supported in the porous layer of the recording sheet can be obtained. The image of the recorded product can be maintained for a long period of time even outdoors.

As the hydrocarbon group with a hydroxy group in the polymerizable binder, an alkyl group having at least one hydrogen atom substituted by a hydroxyl group is preferred, and a $C_{1-5}$ hydroxyalkyl group is particularly preferred. As the polyoxyalkylene chain, a polyoxyethylene chain is preferred, and in this case, the number of oxyethylene repeating units is preferably from 3 to 20.

As the substituent with an unsaturated bond, a methacryloyl group or an acryloyl group is preferred. As the substituent with an epoxy group, a glycidyl-group is preferred. The substituent with an unsaturated bond or the substituent with an epoxy group, and the hydrocarbon group with a hydroxy group or the polyoxyalkylene chain, may be bonded by another substituent. In order to obtain the polymerized product having a high degree of polymerization, in the case of the substituent with an epoxy group, preferably at least two substituents are contained in the molecule of the polymerizable binder. In the case of the polymerizable binder having the polyoxyalkylene chain, it may be one having a substituent with an unsaturated group or a substituent with an epoxy group only at one terminal end. However, one having a substituent with an unsaturated group or a substituent with an epoxy group at both terminal ends is preferred As such a compound, 2-hydroxyethyl acrylate, 2-hydroxyethyl methacrylate, a polyethylene glycol diacrylic acid ester, a polyethylene glycol dimethacrylic acid ester, or a polyethylene glycol monomethyl ether monomethacrylic acid ester may be mentioned. Polyethylene glycol diglycidyl ether or an ester compound having acrylic acid or methacrylic acid added on both terminal epoxy groups of polyethylene glycol diglycidyl ether, may be mentioned. In such a compound, an unsaturated bond of the acryloyl group or the methacryloyl group is attributable to the polymerization.

As the polyvinyl alcohol, it is preferred to use one having a polymerization degree of from about 1,000 to about 4,000 and a saponification degree of from 95 to 100%. The polyvinyl alcohol which is partially modified may be used.

In the coating fluid of the present invention, in the case of the polymerizable binder having a substituent with an unsaturated bond, it is preferred to add a peroxide polymerization initiator, in order to promote the polymerization of the polymerizable binder. In the case of the polymerizable binder having a substituent with an epoxy group, it is preferred to preliminarily add an imidazole curing agent.

As the alumina hydrate, a boehmite represented by the compositional formula of $Al_2O_3 \cdot nH_2O$ (n is from 1 to 1.5) is preferred. It is suitable as an ink-receiving layer since the colorant is well absorbed and fixed in it. The alumina hydrate particles are preferably one having a primary particle size of from about 1 to about 100 nm, and it may be monodispersed or secondary coagulated in the coating fluid. The concentration of the alumina hydrate particles in the coating fluid of the present invention, is preferably from 5 to 30 wt %, particularly preferably from 10 to 20 wt %.

The material of the substrate in the recording sheet of the present invention is not particularly limited, and various materials can be used. Specifically a plastic including a polyester resin such as polyethylene terephthalate, a polycarbonate resin or a fluorine resin such as a polyethylene-polytetrafluoroethylene copolymer is preferably used. Such a material may be subjected to a corona discharge treatment or various undercoating, in order to e.g. improve the bonding strength of the porous layer.

In the case of using a transparent plastic film as the material, a transparent printed product which can be used for e.g. an overhead projector can be obtained. In the case of using an opaque plastic film containing a white pigment or a paper sheet as the material, a recorded product which is equivalent to the silver halide photography can be obtained.

As a means to coat the coating fluid of the present invention on the substrate, e.g. a dye coater, a roll coater, an airknife coater, a blade coater, a rod coater, a bar coater or a comma coater may be employed. In order to promote the polymerization of the polymerizable binder, it is possible to carry out the treatment by e.g. heat, ultraviolet rays or electron beam after coating.

The porous layer preferably has pores having pore radii which are substantially from 1 to 15 nm, and the pore volume is preferably from 0.3 to 2.0 cc/g. This is preferred since the porous layer will have an adequate absorptivity, and transparency. The average pore radius of the porous layer is particularly preferably from 3 to 10 nm. The pore radii distribution was measured by a nitrogen adsorption/desorption method.

The thickness of the porous layer in the recording sheet is suitably selected depending upon e.g. the specification of the printer, and it is usually preferably from 5 to 100 $\mu$m. If the thickness of the porous layer is less than 5 $\mu$m, absorptivity may be insufficient. If the thickness of the porous layer is more than 100 $\mu$m, transparency of the porous layer may deteriorate, or the strength of the layer may decrease.

The means to carry out recording on the recording sheet of the present invention is not particularly limited, but the ink jet system is preferably employed. The recorded product thus obtained has a colorant of the ink supported in the porous layer. The recorded product has not only high color reproducibility and high color density, but also excellent light resistance and weather resistance. Therefore, it can be used even outdoors.

Now, the present invention will be described in further detail with reference to Examples. However, it should be understood that the present invention is by no means restricted to such specific Examples.

EXAMPLES 0.8 g of 2-hydroxyethyl acrylate as a polymerizable binder was dissolved in 100 g of an alumina sol having a solid content of 20 wt % and containing alumina hydrate particles made by hydrolysis and peptization of an aluminum alkoxide. Further, 10 g of an aqueous solution containing 8 wt % of polyvinyl alcohol (polymerization degree: 2,600, saponification degree: 96%) and 0.024 g of peroxide polymerization initiator (Perbutyl H-69, Nyper BW, manufactured by NOF Corporation) were mixed thereto to obtain an alumina hydrate coating fluid.

In a similar manner, an alumina hydrate coating fluid was obtained wherein the same amount of the following polymerizable binder was used instead of 2-hydroxyethyl acrylate. The polymerizable binder may be an ester having acrylic acid added on epoxy groups at the terminal ends of 2-hydroxyethyl methacrylate, polyethylene glycol diacrylic acid ester (n=4), polyethylene glycol diacrylic acid ester (n=9), polyethylene glycol diacrylic acid ester (n=14), polyethylene glycol monomethyl ether monomethacrylic acid ester (n=9) or polyethylene glycol diglycidyl ether (n=4), or an ester having acrylic acid added an epoxy groups at the terminal ends of polyethylene glycol diglycidyl ether (n=9). Here, (n=4), for example, means that the average number of oxyethylene repeating units of the polyoxyethylene is about 4.

Further, a coating fluid was prepared in a similar manner, wherein as a polymerizable binder, polyethylene glycol diglycidyl ether (n=4) or polyethylene glycol diglycidyl ether (n=9) was used, and instead of the peroxide polymerization initiator, 0.024 g of an imidazole curing agent (Shikoku Corp., Curezole 2MZ) was used.

The coating fluid was coated on the polyethylene terephthalate film (thickness: 100 $\mu$m) by using a bar coater so that the coating thickness after the coating fluid was dried, was 20 $\mu$m, to form an alumina hydrate layer. Then, the alumina hydrate layer was dried and subjected to heat treatment at 140° C. to obtain a recording sheet.

On the recording sheet, printing of a test pattern using inks having water-soluble colorants, was applied by using an ink jet printer (PM700C, manufactured by Seiko Epson K.K.). The obtained recorded product was left outdoors for 1 month. Then, the surface of the recorded product was visually inspected, and no peeling of the coated layer was observed. For the purpose of comparison, a coating fluid was prepared wherein only the polyvinyl alcohol was used as a binder, and a recording sheet was obtained, followed by the same evaluation. In this case, substantial peeling of the coated layer was observed.

With the coating fluid of the present invention, an alumina hydrate porous layer having high weather resistance can be formed. The recording sheet of the present invention has a high ink absorptivity and fixing property, and there is no peeling of the coated layer even when used outdoors. It is particularly suitable for recording using a water-soluble ink, and it is suitable as a recording medium for an ink jet printer. The recorded product of the present invention has a good image quality which can be maintained for a long period of time.

What is claimed is:

1. An alumina hydrate coating fluid having alumina hydrate particles dispersed in an aqueous medium, which contains, as binders, a polyvinyl alcohol and a polymerizable binder which is a compound having a hydrocarbon group with a hydroxy group or a compound having a polyoxyalkylene chain, said compound having a substituent with an unsaturated bond or a substituent with an epoxy group.

2. The alumina hydrate coating fluid according to claim 1, wherein the polyvinyl alcohol is from 20 to 80 wt % to the total amount of the polyvinyl alcohol and the polymerizable binder.

3. The alumina hydrate coating fluid according to claim 1, wherein the polyvinyl alcohol is from 40 to 60 wt % to the total amount of the polyvinyl alcohol and the polymerizable binder.

4. The alumina hydrate coating fluid according to claim 1, wherein the total amount of the polyvinyl alcohol and the polymerizable binder is from 5 to 50 wt % to the alumina hydrate.

5. The alumina hydrate coating fluid according to claim 1, wherein the polymerizable binder is a compound having a $C_{1-5}$ hydroxyalkyl group.

6. The alumina hydrate coating fluid according to claim 1, wherein the polymerizable binder is a compound having a polyoxyethylene chain having a number of oxyethylene repeating units of from 3 to 20.

7. The alumina hydrate coating fluid according to claim 1, wherein the polymerizable binder is a compound having a methacryloyl group or an acryloyl group.

8. The alumina hydrate coating fluid according to claim 1, wherein the polymerizable binder is a compound having a glycidyl group.

* * * * *